United States Patent [19]
Mills

[11] Patent Number: 6,039,115
[45] Date of Patent: Mar. 21, 2000

[54] SAFETY COUPLING FOR ROTARY PUMP

[75] Inventor: Robert A. R. Mills, Bragg Creek, Canada

[73] Assignee: Kudu Indutries, Inc., Canada

[21] Appl. No.: 09/049,900

[22] Filed: Mar. 28, 1998

[51] Int. Cl.$^7$ .............................. E21B 43/00; F16D 9/00
[52] U.S. Cl. ..................... 166/68.5; 166/76.1; 188/82.1
[58] Field of Search .......................... 166/68, 68.5, 78.1, 166/76.1; 192/104 C; 188/82.1, 82.5; 418/48

[56] References Cited

U.S. PATENT DOCUMENTS

| | | | |
|---|---|---|---|
| 2,514,228 | 7/1950 | Dodge | 192/104 |
| 4,687,085 | 8/1987 | Shimizu et al. | 192/89.2 |
| 4,797,075 | 1/1989 | Edwards et al. | 418/48 |
| 4,840,543 | 6/1989 | Geberth, Jr. | 417/223 |
| 5,151,068 | 9/1992 | Mann et al. | 475/322 |
| 5,257,685 | 11/1993 | Tichiaz et al. | 192/46 |
| 5,358,036 | 10/1994 | Mills | 166/68.5 |
| 5,358,455 | 10/1994 | Lundstrom | 475/101 |
| 5,370,179 | 12/1994 | Mills | 166/68.5 |
| 5,405,293 | 4/1995 | Severinsson | 464/2 |
| 5,469,950 | 11/1995 | Lundstrom et al. | 192/85 |
| 5,551,510 | 9/1996 | Mills | 166/68 |

FOREIGN PATENT DOCUMENTS

| | | | |
|---|---|---|---|
| 965253 | 4/1975 | Canada | 64/20 |
| 0 105 789 | 4/1984 | European Pat. Off. | F16D 27/10 |

*Primary Examiner*—Frank S. Tsay
*Attorney, Agent, or Firm*—Pendorf & Cutliff

[57] ABSTRACT

A safety coupling for preventing backspin at excessive speeds of a torque transmitting drive string which stores reactive torque due to torsional stress. The safety coupling includes a rotatable driving member to be coupled with a rotatable driven member to be coupled with the driving string for axial rotation therewith. The driven member is movable relative to the driving member between an engaged position wherein the driving and driven members are coupled by a torque transfer structure to provide a positive driving connection between the torque transmitting drive and the shaft, and a disengaged position wherein the driving and the driven members are freely rotatable relative to each other so that back-spin of the torque transmitting drive is prevented. The driven member is biased into the disengaged position and forced into the engaged position only during forward rotation of the shaft. To start rotation of the shaft, the coupling further includes an auxiliary coupling component which transfers a selected torque between the driving and driven members for start-up of the shaft from standstill and to force the driven member into the engaged position. The auxiliary coupling component is disengaged before potentially dangerous levels of reactive torsion are stored in the shaft, which prevents potentially hazardous back-spin, should the main coupling components of the driving and driven members and torque transfer structure fail.

17 Claims, 6 Drawing Sheets

SAFETY COUPLING FOR ROTARY PUMP

FIELD OF THE INVENTION

The present invention relates to rotary drive strings which store reactive torque. More particularly, the invention relates to drive strings for rotary pumps, which strings store reactive torque by reason of their large length and relatively small diameter and a head of fluid which causes the pump to become a motor when power to the drive string is interrupted.

BACKGROUND OF THE INVENTION

Pumping systems wherein the pump is driven by a drive shaft or drive string are subject to torsional stresses and the resultant torsional strain increases with the length of the shaft or string and large amounts of energy may be stored as torsion in the drive train. Many pumping systems also store a head of fluid in the production tubing which stores large amounts of energy in the system, which may be released by reverse rotation of the drive string when the fluid drains through the pump causing it to motor backwards. When drive power to the system is interrupted, the reactive torque is released as backspin and, if an uncontrolled release of torque occurs, personal injury and/or property damage can result. This is the case, for example, in deep well down hole rotary pumps such as progressing cavity pumps. Rotary down hole pumps have been used in water wells for many years. More recently, especially progressing cavity pumps have been found well suited for the pumping of viscous or thick fluids such as crude oil laden with sand. Rotary down hole pumps are generally driven by sucker rod drive strings which usually have a relatively small diameter of ¾ to 1⅛ inches. Such drive strings are commonly used in wells that vary from 1,500' to 6,000' in depth, 3,000' being a common average.

Progressing cavity pumps include a stator which is attached to a production tubing at the bottom of a well and a rotor which is attached to a bottom end of the drive string. The elongated drive string is subject to considerable torsional force which increases with the viscosity of the liquid being pumped and the displacement of the pump. This torsional force is stored in the elongated drive string as reactive torque. Forty to sixty revolutions of torsion can be stored in the drive string with a high-capacity pump in normal operation in a 1000 m deep well. If the pump seizes, which is a frequent occurrence in viscous, sand-laden crude oil, several hundreds of revolutions of torsion may be stored before the prime mover stops. When power is interrupted to the drive string, the reactive torque is released. Unless the release of reactive torque is controlled, violent backspin of the drive string will result, especially if an electric motor is used as a power source, which, when disconnected from the power supply, offers almost no resistance to reverse rotation. This can lead to costly and undesirable damage to equipment and/or personal injury to workmen in the vicinity of the equipment.

Various braking systems have been developed which provide for a controlled release of the reactive torque stored in the drive string of down hole rotary pumps upon interruption of drive power to the drive string. These are fluid brakes or hydraulically operated brakes, such as disclosed in commonly owned U.S. Pat. No. 5,358,036, the complete disclosure of which is incorporated herein by reference, or other braking systems which operate on centrifugal braking principles (U.S. Pat. Nos. 4,216,848 to Toyohisa Shiomdaira; U.S. Pat. No. 4,797,075 to Wallace L. Edwards et al.; and U.S. Pat. No. 4,993,276 to Wallace L. Edwards). However, although these braking systems are all intended to control the release of reactive torque stored in the drive train, they are all subject to possible failure due to wear, exposure to the elements, accidental damage, etc. If power to the drive string is interrupted and the braking system fails, uncontrolled back-spin of the drive string will occur which can result in damage not only to the drive train but also to the braking system. Even more importantly, maintenance personnel unaware of the braking system failure and relying on the system to control the release of any reactive torque stored in the drive string after shut-off, can be severely injured. The violent, uncontrolled back-spin of the drive string observed in the absence of braking systems or with improper or damaged braking systems has led to drive pulleys exploding, drive string free ends breaking off, and electric drive motors destructing. Thus, a "fail-safe" back-up system is desired which would prevent damage to the equipment rotating the drive string and injury to personnel upon back-spin of pump drive strings caused by the uncontrolled release of reactive torque stored therein.

Brake systems also fail frequently because of the head of fluid in the tubing. This column of fluid stores a large amount of potential energy, especially in low productivity wells and wells with low formation pressure. The fluid usually drains back through the pump causing it to become a motor which will drive the string backwards for an extended period of time, typically 15 to 30 minutes. The stored energy must be absorbed and dissipated by the brake which is, therefore, subjected to extreme heat and wear, if it does not have adequate capacity.

SUMMARY OF THE INVENTION

It is an object of the invention to provide a relatively simple and reliable safety coupling for permitting rotation of a drive string in a first direction and for automatic disconnection of the shaft upon stoppage and subsequent back-spin of the shaft caused by the release of torsion stored in the drive string when power to the drive string is interrupted.

It is a further object of the invention to provide a safety coupling for elongated pump drive strings which automatically disconnects the drive string from the power source upon stoppage and subsequent back-spin of the drive string due to the release of reactive torque stored in the elongated drive string, when power to the drive string is interrupted.

It is yet another object of the invention to provide a safety coupling for automatically disconnecting the drive string of a down hole rotary pump when power to the drive string is interrupted.

It is an object of the invention that the safety coupling be "fail-safe", i.e., it will disconnect when the means which operates the safety coupling and/or the brake fails.

It is a further object of the invention to provide an automatic means of reconnecting the drive string to the drive means upon re-start.

It is an additional object of the invention to provide a safety arrangement for a rotary shaft which stores reactive torque due to elastic torsion of the shaft, which arrangement includes, in combination, a safety coupling in accordance with the invention and a safety disk brake, which are operated by a common actuating means automatically operating the safety coupling to connect the shaft to a power source upon forward rotation of the shaft and operating the disk brake simultaneous to disengagement of the safety coupling upon back-spin of the shaft to simultaneously disconnect the shaft from the power source and slow down the back-spin of the shaft.

BRIEF DESCRIPTION OF THE DRAWINGS

The invention will now be further described by way of example only and with reference to the following drawings, wherein.

DETAILED DESCRIPTION OF THE PREFERRED EMBODIMENT

The safety coupling in accordance with the invention is useful for disconnecting elongated drive strings, which store reactive torque due to torsional stress, from a torque transmitting drive upon excessive counter-rotation or back-spin of the drive string, such as the sucker rod strings used to drive rotary down hole pumps. The safety coupling is not limited to that application and may be used in conjunction with a shaft which transmits reactive torque and back-spins when power is interrupted to the shaft. For purposes of illustration only, the safety coupling in accordance with the invention is described in conjunction with a drivehead suitable for use with a sucker rod string typically used to drive a rotary down hole pump such as a progressing cavity pump.

Figure 1:
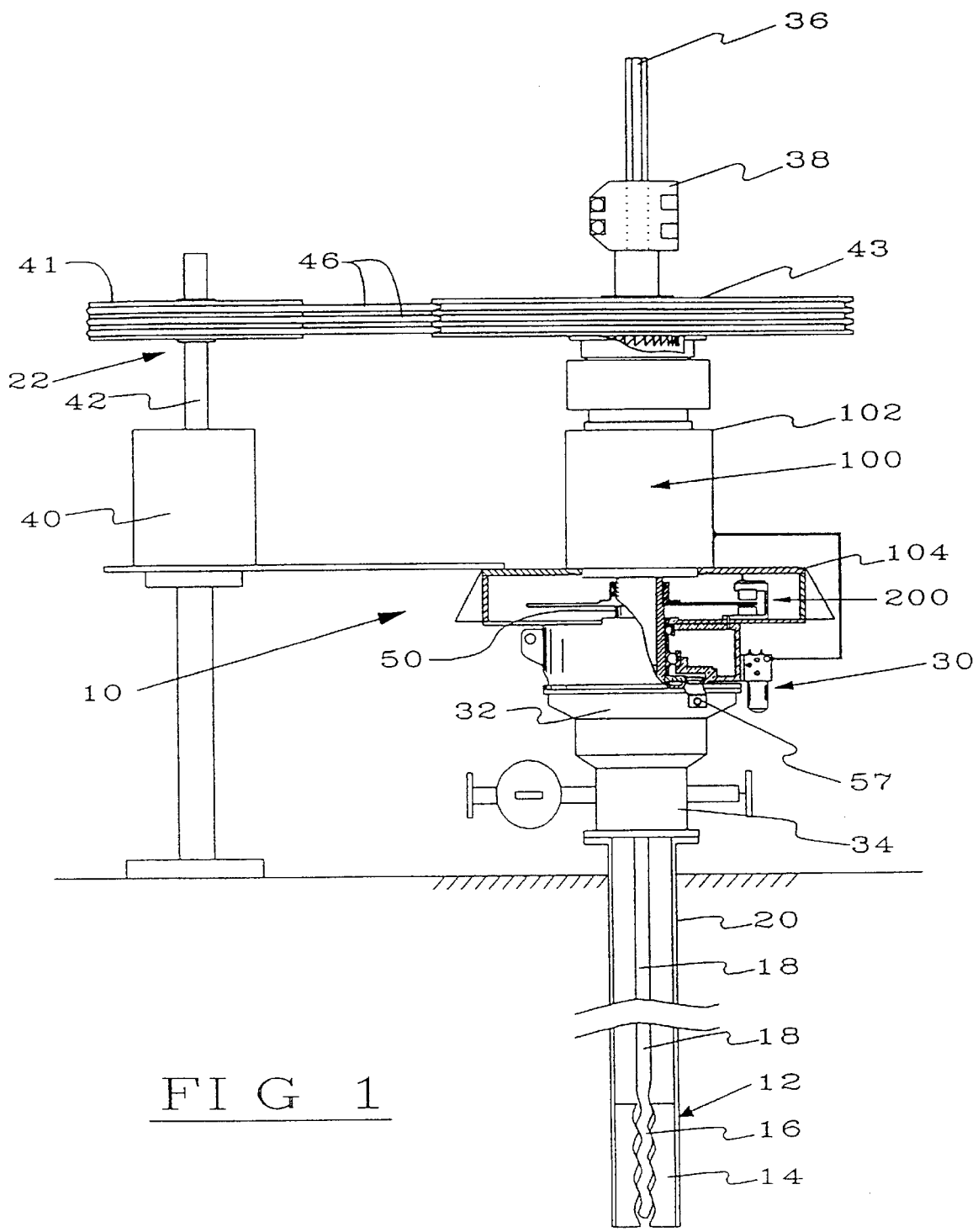
FIG. 1 is a schematic side elevational view of a rotary down hole pump arrangement which includes a safety coupling in accordance with the invention as well as a safety disc brake.

One preferred application of a safety coupling in accordance with the invention is illustrated in FIG. 1 which shows a rotary down hole pump drivehead assembly 10 used for the operation of a progressing cavity down hole pump 12 that includes a stator 14 and a rotor 16. The rotor 16 is connected with the drivehead assembly 10 by a drive string 18 which is rotatable in a production tubing or well casing 20. The rotary drive assembly 10 includes a drivehead 30, the construction of which will be discussed in detail below with reference to FIG. 4. The drivehead 30 includes a drive spindle 50 which is rotatably supported in the drivehead 30 in a manner well-known in the art (see commonly owned U.S. Pat. No. 5,370,179), a safety coupling 100 in accordance with the present invention which is connected to the drive spindle, and a brake mechanism 200 to slow down back-spin of the shaft. A mounting frame 32 which is screwed to the top end of a well head assembly 34 supports the safety brake mechanism 200. The safety coupling 100 in accordance with the invention is mounted above the brake mechanism 200 by way of a housing 102 and a yoke 104. The brake mechanism is preferably a uni-directional shaft brake such as disclosed in commonly owned U.S. Pat. No. 5,358,036, the complete disclosure of which is herewith incorporated by reference. The drive string 18 incudes a slip shaft 36, preferably of hexagonal cross-section (see FIGS. 1 and 4), which extends through and is rotated by drivehead 30 as will be described below. The drive string 18 is suspended from the drivehead 30 by way of a clamp 38 which is shaped to accommodate an end of the slip shaft 36 that protrudes upward from the drive spindle 50. The clamp 38 is fastened to the slip shaft 36 above the drive spindle 50 and rests on a top surface thereof. Torque is transmitted to the drive string 18 through a torque transmitting drive 22 which includes an electric motor 40, a drive pulley 41, drive belts 46, a driven pulley 43 and the safety coupling 100. The drive pulley 41 is mounted to a drive axis 42 of the motor 40 and the driven pulley is freely rotatably mounted around the drive spindle 50 and connectable to the drive string for torque transmission by a safety coupling 100 as will be described in detail below with reference to FIGS. 2A, 2B, 3A, 3B, and 4. Multiple V-belts 46 are tensioned around the drive and driven pulleys 41 and 43 and transfer torque from the motor 40 to the safety coupling 100. The mounting of the safety coupling 100 on the drive spindle 50 and the detailed construction of the safety coupling will be discussed in detail below. Alternatively, the torque transmitting drive 22 may be a right angle gear drive powered by an internal combustion engine (not illustrated) or a comparable torque producing power source, in a manner well known in the art.

Figure 2A:
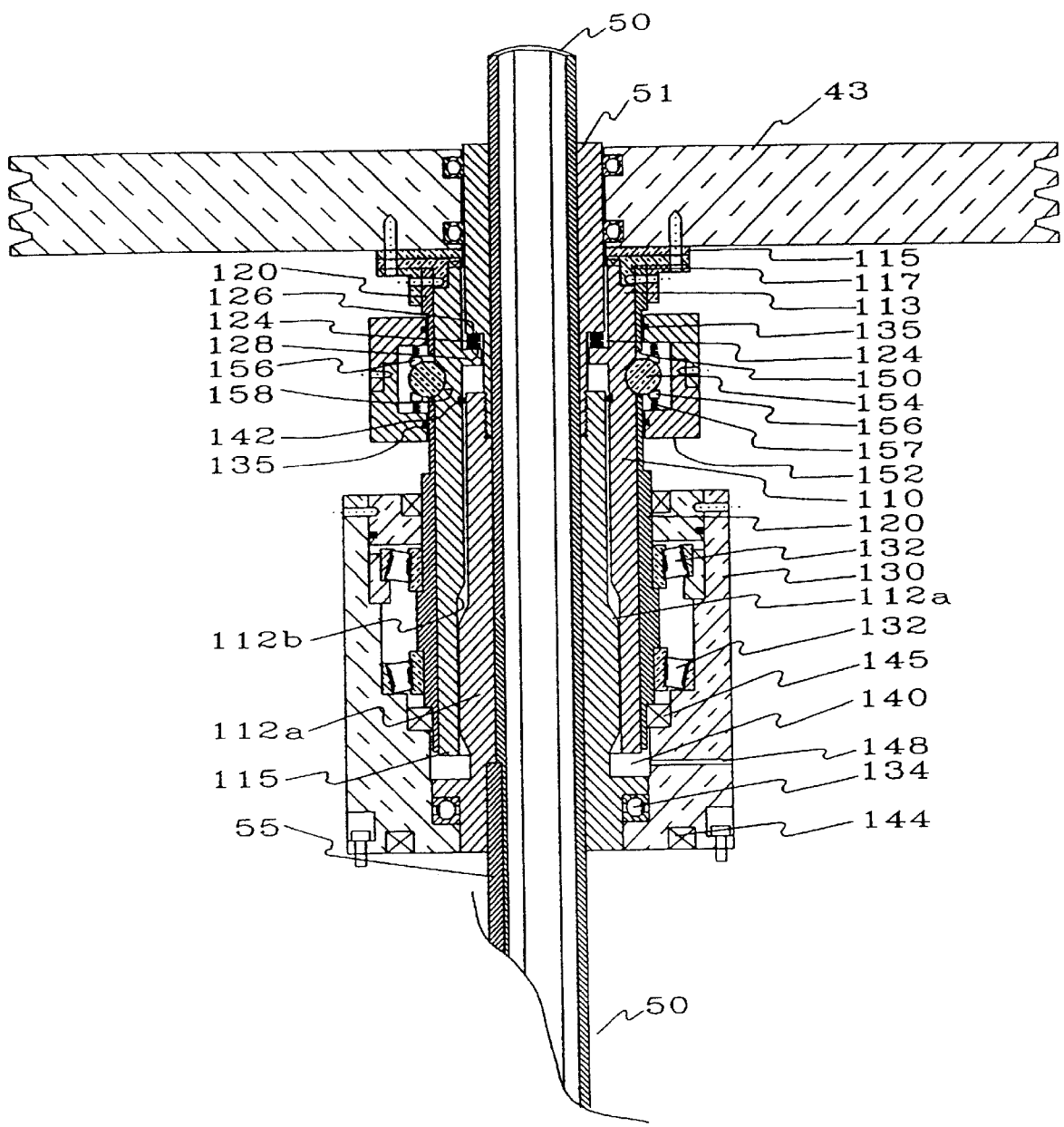
FIGS. 2A and 3A show axial cross-section through the preferred embodiment of a safety coupling in accordance with the invention, the safety coupling being shown in the engaged condition in FIG. 2A and in the disengaged condition in FIG. 3A.
Figure 2B:
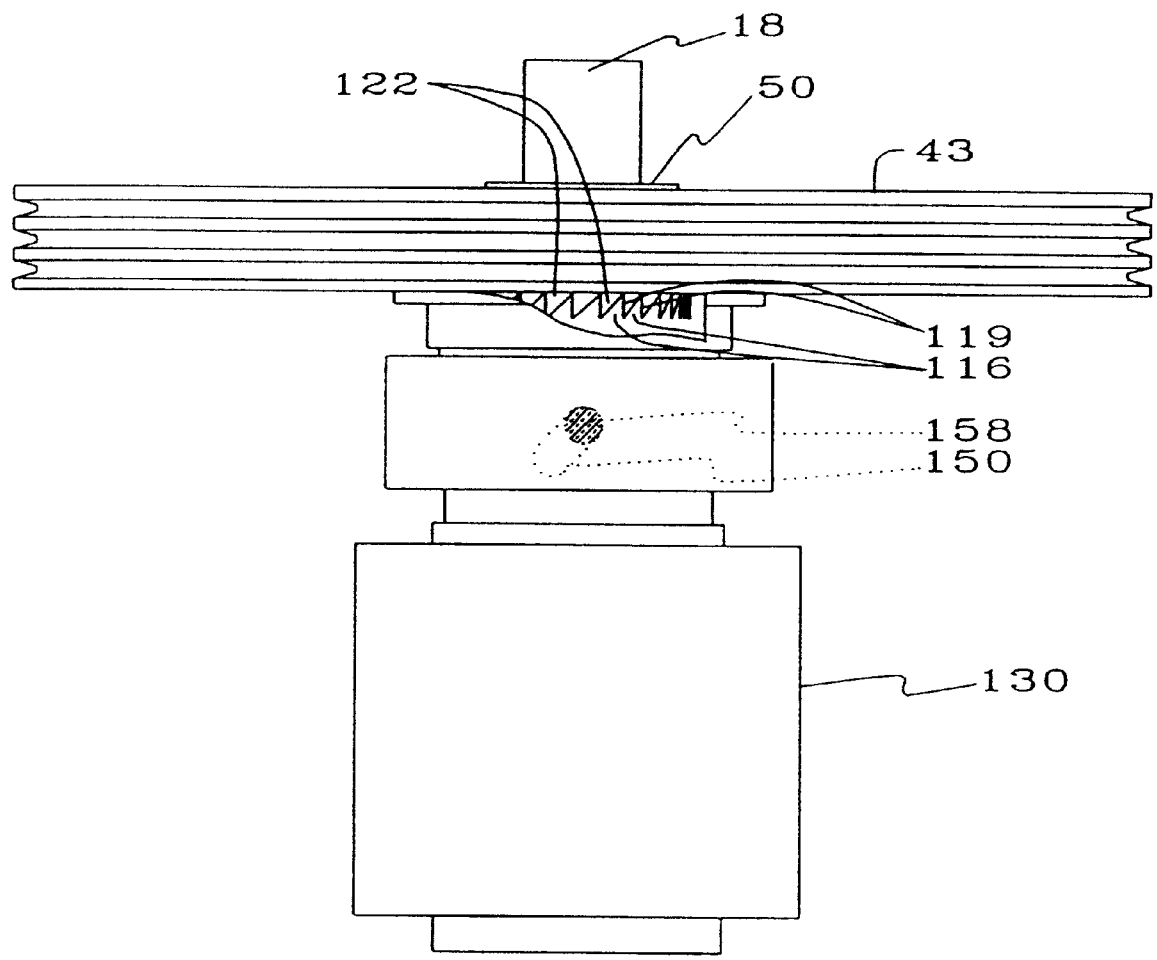
FIGS. 2B and 3B are side elevational views of the embodiment shown in FIGS. 2A and 3A respectively.

FIG. 2A shows a cross-section of the preferred embodiment of the safety coupling of the invention in the engaged and running position. From the inside out, it consists of a shaft coupler 51 for connection to the protruding top of the drive spindle 50. This feature allows for the weight of the drive string 18 to be suspended from the top of the drive spindle by means of rod clamp 38 (see FIG. 1) resting on the top end of the spindle in a manner well-known in the art. Rotation of the drive string 18 relative to the spindle 50 is prevented either by a key or a hexagonal profile in the drive spindle 50 wherein the hexagonal shaft 36 (see FIGS. 1 and 4) is fittingly received. The shaft coupler 51 is prevented from rotating on the spindle 50 by a key 55. A sliding sleeve 110 axially slidably and concentrically surrounds the shaft coupler 51. The sliding sleeve 110 is rotationally connected to the shaft coupler for torque transmission during forward rotation by multiple splines 112a on shaft coupler 51 equidistantly distributed about the central axis of rotation and respectively received in complementary receiver 112b in sliding sleeve 110. At its top end 113, the sliding sleeve 110 is provided with a multitude of first locking teeth 116 (see FIG. 2B). A carrier sleeve 120 concentrically surrounds the sliding sleeve and carries the torque transmitting pulley 43 of the torque transmitting drive 22 (see FIG. 1). The driven pulley 43 is mounted on a flange 115 affixed to the top end of the carrier sleeve 120. Second locking teeth 122 (FIG. 2B) in the form of a spur gear 117 are also affixed to the top end of the carrier sleeve 120 and are complementary to and interlock with the first locking teeth 116 of the sliding sleeve 110, when the sliding sleeve is in the engaged position as shown in FIG. 2A. The first and second locking teeth 116, 122 are of saw tooth shape and provide the preferred torque transfer means according to the invention for releasibly connecting the driving member of the safety clutch, the carrier sleeve 120, with the driven member of the safety clutch, the sliding sleeve 110. The latter can slide vertically a sufficient distance to engage and disengage the first and second locking teeth 116, 122. The sliding sleeve 110 is biased into the disengaged position by biasing means, in this embodiment a plurality of axially acting, helical disconnect springs 124 positioned between a radial shoulder 126 of the shaft coupler 51 and an axially opposite, second radial shoulder 128 of the sliding sleeve 110. The shaft coupler 51 is concentrically rotably supported in a stationary housing 130 ny axial thrust bearings 134. The carrier sleeve 120 is concentrically, rotatably supported in the stationary housing 130 by way of radially acting tapered roller bearings 132. The housing 130 is concentrically mounted on the drivehead. The housing 130, shaft coupler 51 and carrier sleeve 120 define an annular oil-filled, hydraulic actuating chamber 140 directly adjacent the bottom end 115 of the sliding sleeve 110. The actuating chamber 140 is sealed to ambient by a first lip seal 142 positioned between the shaft coupler 51 and sliding sleeve 110, a second lip seal 144 positioned between the shaft coupler 51 and the housing 130 and a third lip seal 145 positioned between the carrier sleeve 120 and the housing 130. Thus, the sliding sleeve 110 acts as a hydraulic piston and is moved axially upward against the force of the disconnect springs 124 upon pressurization of the actuating chamber 140. Pressurized hydraulic fluid is supplied to the actuating chamber 140 through a radial bore 148 provided in the housing 130 and from a hydraulic pump 57 (see FIGS. 1 and 4), which will be discussed in more detail below and which produces pressurized fluid during forward rotation of the spindle 50. The pump 57 is preferably the lubricating oil pump included in conventional rotating well-head arrangements (see commonly-owned U.S. Pat. No. 5,358,036).

Above the housing 130 and below its top end, the carrier sleeve 120 is provided with a number of circumferentially equidistantly spaced elongated slots 150 (see also FIGS. 2B, and 3B, one shown in broken lines), which are angled at 45' to the axis of rotation. An annular ball housing 152 closely surrounds the carrier sleeve 120 in the region of the slots 150 and houses a number of balls 154 which are positioned one each in and fit into the slots 150. The balls 154 are forced into the slots 150 by way of spring-loaded ball washers 156. The sliding sleeve 110 is provided with a number of circular detents 158 for respectively receiving the balls 154. The detents are also circumferentially equidistantly positioned and are positioned in axial direction such that they are located at the same height as the upper end of the slots 150 when the sliding sleeve 110 is in the coupled position. The ball housing 152 is slidably sealed against the carrier sleeve 120 by O-rings 135.

During operation, when power is supplied to the drive string 18 and it is rotated forward during pumping, the hydraulic actuating chamber 140 is pressurized and the sliding sleeve 110 is in the engaged position (see FIG. 2A) wherein the first and second locking teeth 116, 122 are engaged so that torque is transmitted from the pulley 43 to the drive string 18 by way of the locking teeth 116, 122 coupling the carrier sleeve 120 and the sliding sleeve 110, the splines 112 connecting the sliding sleeve 110 and the shaft coupler 51, and the key 55 locking the shaft coupler 51 to the spindle 50 which engages the drive string 18 as described above. The balls 154 are fully engaged in the detents 158 (see also FIG. 2B), but do not transmit any torque, since the locking teeth 116, 122 are engaged and prevent rotation of the carrier sleeve 120 relative to the sliding sleeve 110. Pressurized hydraulic fluid is constantly supplied to the actuating chamber 140 during operation. The housing 130 is grease packed for lubrication of the bearings. The capacity of the pump is selected so that it always supplies pressurized hydraulic fluid during forward rotation of the shaft to create sufficient force on the sliding sleeve 110 to more than counterbalance the resetting force of the disconnect springs 124.

Figure 3A:
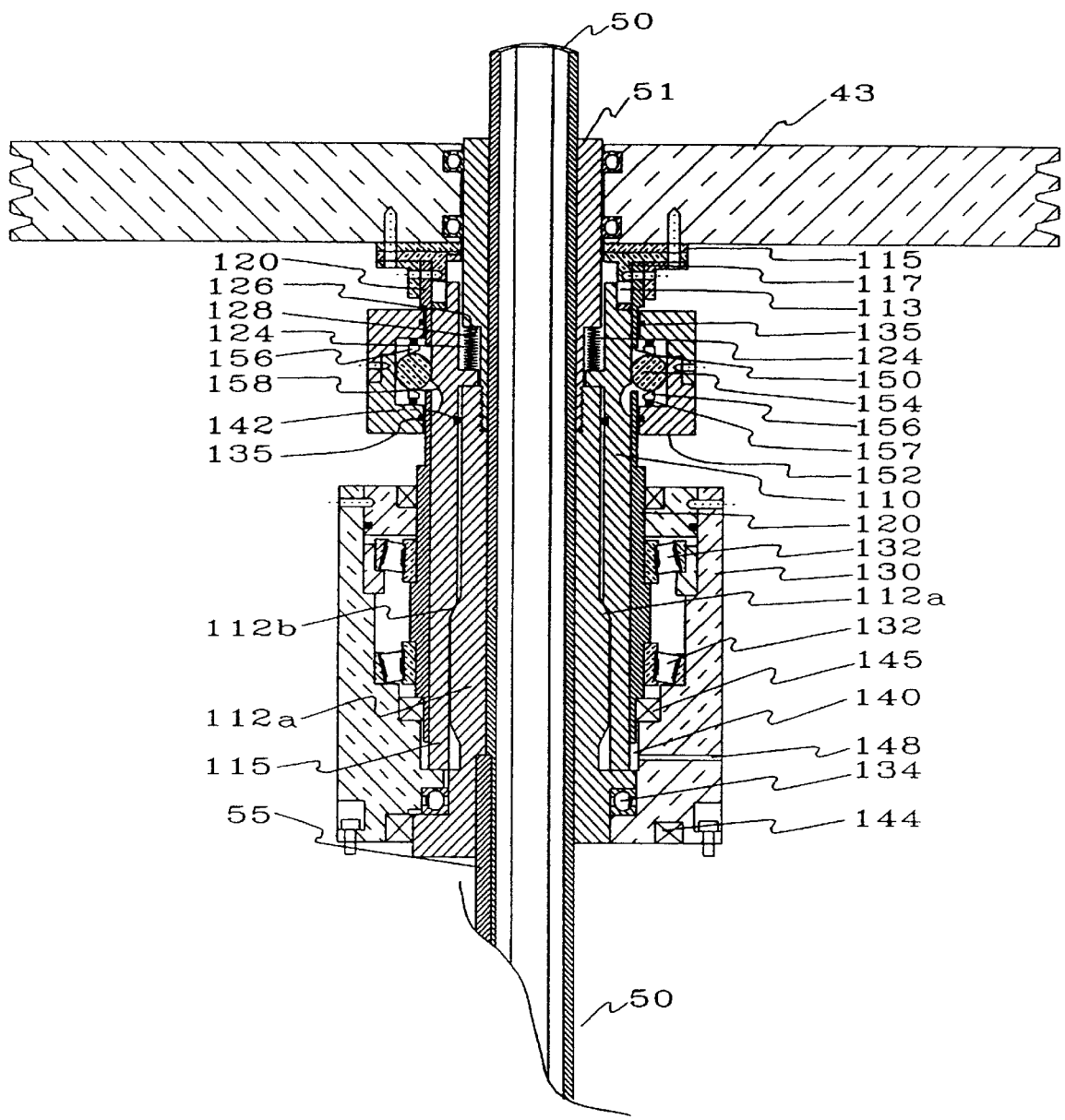
Figure 3B:
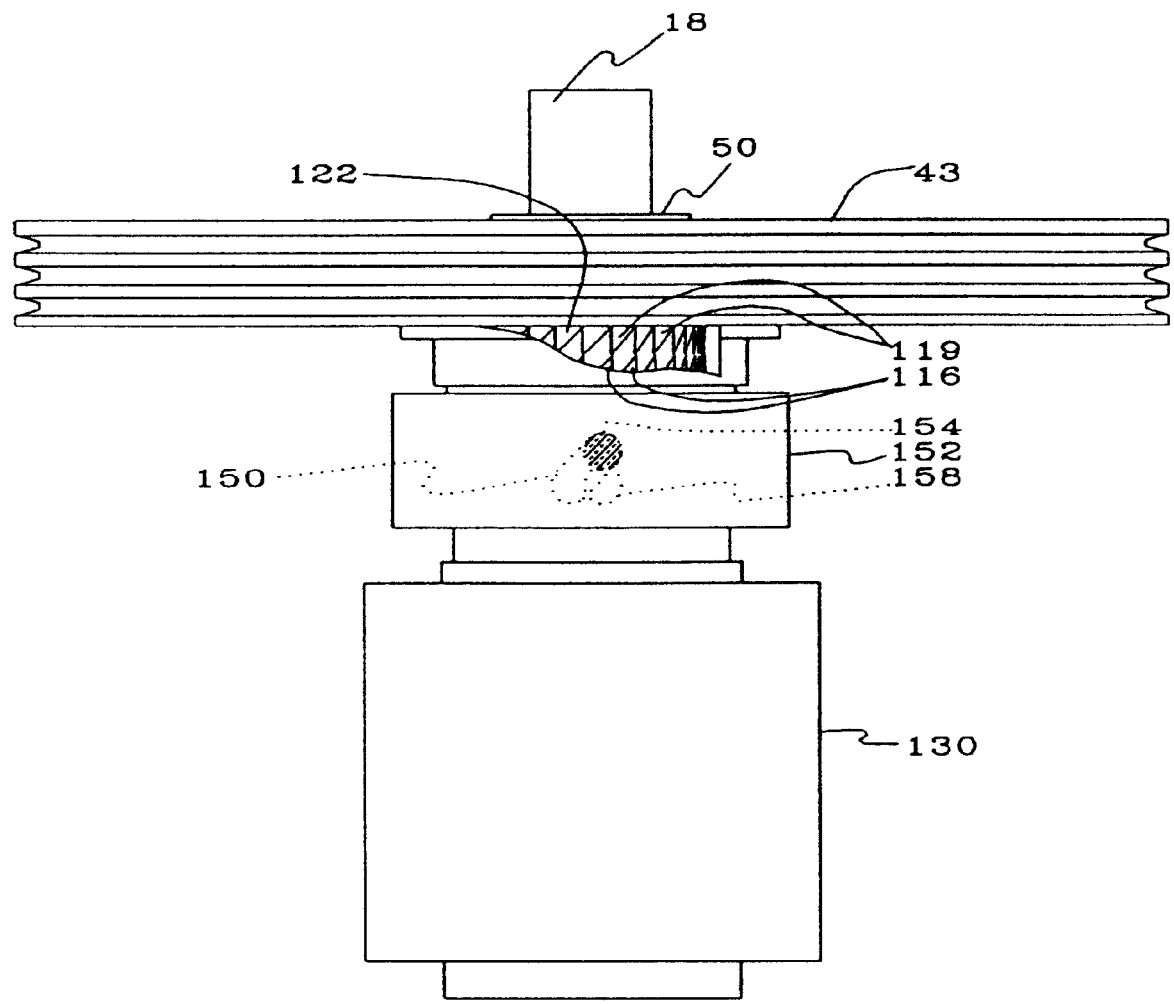

When power is interrupted or the drivehead starts to back-spin for any reason, the pressure in the actuating chamber 140 immediately drops to 0 because the hydraulic pump 57 only supplies the pressurized hydraulic oil during forward rotation of the drive string 18 which is driven off a drivehead rotating component, in this embodiment the spindle 50, and does not produce hydraulic pressure when it turns backwards. As a result, the pressure in the actuating chamber 140 drops and the resetting force of the disconnect springs 124 overcomes the friction between the mating locking teeth 116, 122 and forces the sliding sleeve 110 down into the uncoupled position (shown in FIG. 3A), wherein the locking teeth 116, 122 are disengaged. Simultaneously, the balls 154 are forced out of the detents 158, since the sliding sleeve 110 is forced vertically downward, guided by the vertical tooth surfaces 119 (see FIGS. 2B and 3B) of the locking teeth 116, 122. The sliding sleeve 110, shaft coupler 51, spindle 50 and drive string 18 then rotate backwards while the driven pulley 43 remains stationary or rotates at a slow speed because, although it is disconnected from the sliding sleeve 110, there is inertia in the large driven pulley 43. The balls 154 in that position of the sliding sleeve 110 are free to rotate. FIG. 3B illustrates the position of the balls 154 relative to the slots 150 and detents 158 (shown in broken lines). The balls 154 act as a bearing between the sliding sleeve 110 and the carrier sleeve 120 in the uncoupled position of the sliding sleeve. The force of the ball washer springs 157 creates enough drag that the balls 132 are forced up the inclined ramp provided by the angled slots 150, and the ball housing 152 remains in the upper position during the backspin. Thus, the safety clutch of the invention provides an immediate disconnection of the torque transmitting drive 22 and the driven pulley 43 (FIG. 1) from the drive string 18 upon stopping and subsequent backspin of the drive string due to interruption of power to the shaft. Furthermore, the safety coupling of the invention provides a fail-safe system, since the disconnect springs 124 are always energized, and will operate independently of the hydraulic system. Thus, the safety clutch of the invention will also reliably prevent damage to the torque transmitting drive when the hydraulic oil is lost from the hydraulic system. The hydraulic oil preferably is also the lubricating oil for the drivehead. Therefore, when the lubricating oil is lost, the hydraulic pressure drops to 0 and the clutch will disengage thereby protecting the drivehead.

Once the drive string 18 has come to rest after complete release of the elastic torsion therein, the safety clutch of the invention can be automatically re-engaged to recommence the pumping operation. This is advantageous, since down hole rotary pumps are often used in remote areas so that manual re-engagement of the drive system would not be economical, especially when a large number of pumps are affected by a general power outage. To re-engage the clutch after the drive string 18 comes to rest, the electric motor 40 is jogged backwards. This is accomplished automatically upon start-up with a circuitry known in the art and available from Kudu Industries, Inc., Calgary. The inertia of the ball housing and the low friction on the carrier sleeve 120 coupled with the friction of the balls 154 and the sliding sleeve 110, the spring-loaded ball washers 156 and the respectively associated slot 150, which is at an angle pushing the balls down, causes the balls to travel to the bottom end of the slots 150 in the carrier sleeve 120, shifting the ball housing 152 downwards (not shown). In this position, the balls are engaged in the detents 158. The locking teeth 116, 122 are still disengaged, since the sliding sleeve 110 is in the disengaged position. The electric motor 40 is then rotated forward. The balls 154 will transmit enough torque from the carrier sleeve 120 to the sliding sleeve 110 to initiate rotation of the shaft 18. This results in pressure build-up in the hydraulic system. The force of the ball washer springs 157 is selected such that the balls 154 are forced into the detents 158 at sufficient force to transmit enough torque for the hydraulic pressure to buildup. The hydraulic pressure in the chamber 140 overcomes the force of the disconnect springs 124 and forces the sliding sleeve 110 upwards. The sliding sleeve 110 rotates with respect to the carrier sleeve 120 as it moves upwards so that the balls 154 remain in the detents 158 and follow the slots 150. The ball housing 58 is thus shifted upwards to the position shown in FIGS. 2B and 3B. The back slope of engagement teeth 116 and 122 is the same angle as the slots 150 and the engagement teeth 116 and 122 are almost the same height as the vertical travel of the balls 154 to assist in this relative rotation between the sliding sleeve 110 and the carrier sleeve 120, and to provide for a smooth engagement. However, the ball washer springs 157 are not sufficiently strong to hold the balls 154 in the detents 158 for rotation of the pump 12 (see FIG. 1). To the contrary, the force of the ball washer springs 157 is selected such that balls 154 would be forced out of the detents 158 by the carrier sleeve 120 before the torque increased enough to create a potentially hazardous back-spin in the event that the engagement teeth 116 and 122 were not engaged by hydraulic pressure upon start-up. This prevents damage to the drivehead components when the hydraulic system is malfunctioning or the hydraulic oil has been lost. Thus, the safety coupling of the invention provides two separate clutch arrangements, the main clutch arrangement including sliding sleeve 110, carrier sleeve 120 and locking teeth 116, 122 for transition of full torque during operation, and the auxiliary clutch arrangement including balls 154, carrier sleeve slots 150 and sliding sleeve detents 158, which transmit sufficient torque upon start-up to build up hydraulic pressure for engagement of the main clutch arrangement, but not sufficient torque for a build-up of a potentially hazardous back-spin, should the main clutch arrangement fail. Furthermore, failure of the auxiliary clutch arrangement will not lead to damage of the drivehead and its components, since the safety coupling will simply not engage upon start-up of the electric motor 40.

Figure 4:
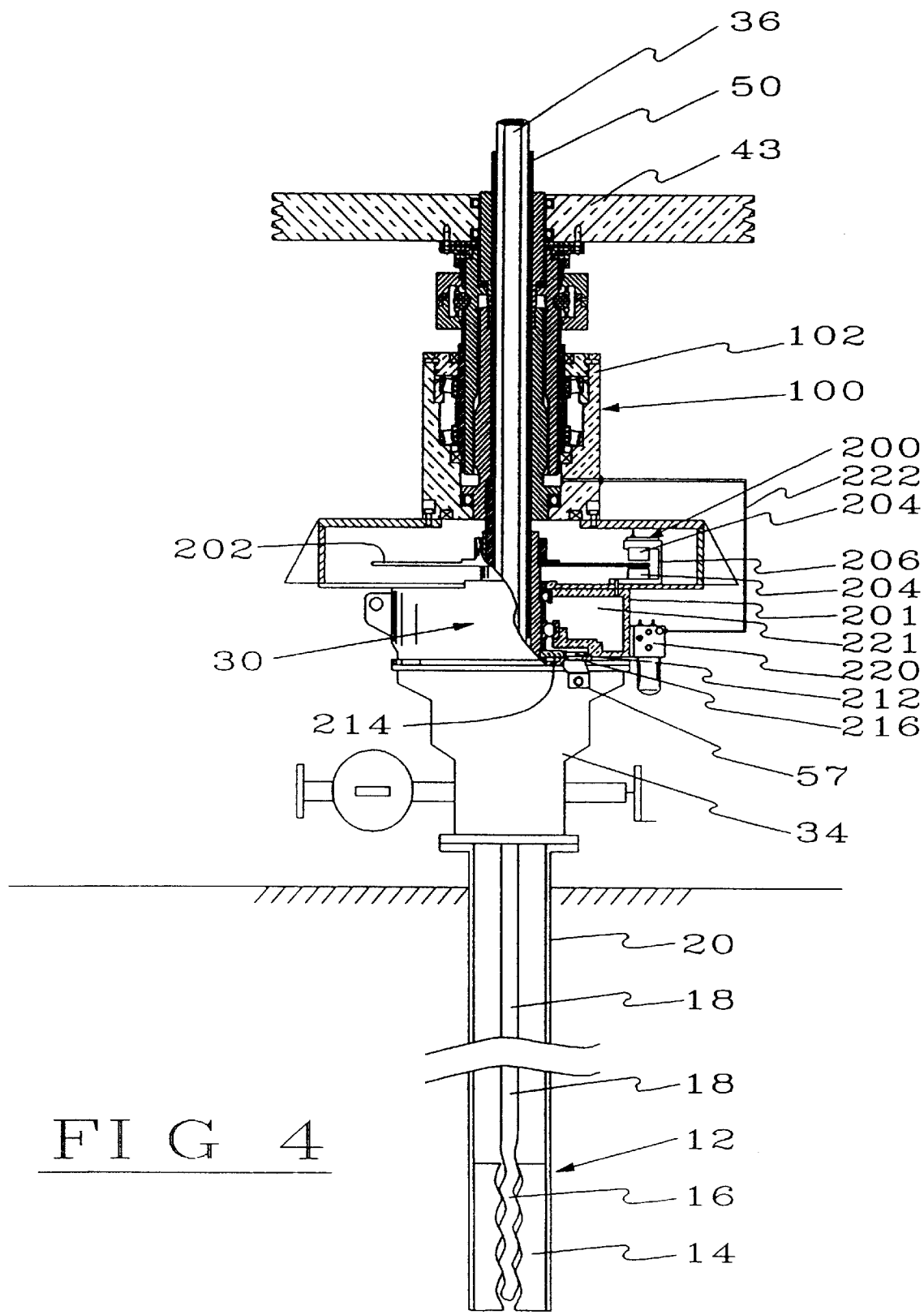
FIG. 4 is an axial cross-sectional view of the drivehead of the rotary down hole pumping arrangement shown in FIG. 1 taken along the same plane as the cross-section of FIG. 2A and illustrating the polished rod and slip shaft as they extend through the drivehead and further including a uni-directional disc brake operationally linked with the safety coupling illustrated in FIGS. 2A and 2B.

In a preferred safety arrangement in accordance with the invention, the safety coupling 100 is combined with a safety brake 200 as shown in FIGS. 1 and 4, whereby both the coupling and the brake are hydraulically operated and supplied with pressurized hydraulic fluid from a common hydraulic pump 57. The safety brake is a hydraulically actuated disc brake including a brake disc 202 mounted on the drivehead hollow shaft or spindle 50, and a brake caliper 206. The brake caliper is preferably of a type commercially available from MICO INCORPORATED, North Markoto, Minn., U.S.A. It is mounted to the drivehead 30 in a manner recommended by the manufacturer. Brake pads 204 are movably supported in the caliper 206 for engagement of the brake disc 202 upon supply of pressurized hydraulic fluid thereto. The hydraulic pump 57 is a bidirectional pump which is driven off the drivehead spindle 50 by means of a pair of gears 212, 214 mounted on the pump shaft 216 and the drivehead spindle 50 respectively. Pressurized hydraulic fluid is supplied selectively to either one of the coupling 100 and the brake 200 by a fluid manifold 220.

During forward rotation of the shaft, pressurized hydraulic fluid produced by the pump is directed by the manifold 220 to the actuating chamber 140 of the coupling through supply line 222. The drivehead 30 also functions as a hydraulic fluid reservoir from which the pump 57 draws the fluid to be pressurized. At the same time, this ensures proper lubrication of the pump and the associated drive and bearing components.

During back-spin of the shaft, no hydraulic fluid is supplied to the coupling 100. Pressurized fluid produced by the pump 57 is directed by manifold 220 to the brake caliper 206 of the brake 200 to force brake pads 204 against brake disc 202. The faster the back-spin, the higher the pressure created by the pump and the larger the brake force of the brake 200. Thus, the coupling 100 is automatically disengaged upon stoppage or back-spin of the shaft and the release of reactive torque in the shaft is controlled by the brake 200. The resulting arrangement is failsafe in that excessive back-spin of the torque transmitting drive components is prevented at all times even if the brake 200 should fail or the hydraulic fluid is lost.

Changes and modifications in the specifically described embodiments can be carried out without departing from the scope of the invention which is intended to be limited only by the scope of the appended claims.

I claim:

1. A safety coupling for releasibly connecting a torque transmitting drive to a drive string which stores reactive torque due to elastic torsion of the shaft, the drive string normally being rotated in a forward direction by the torque transmitting drive, and backspin of the drive string being caused by the release, upon interruption of power to the torque transmitting drive, of the reactive torque stored in the drive string, the safety coupling comprising:

a rotatable driving member to be coupled with the torque transmitting drive;

a driven member to be coupled with the drive string for rotation therewith; the driven member being axially slidable relative to the driving member between an engaged position, wherein the driven member is coupled to the driving member, and a disengaged position, wherein the driven member is freely rotatable relative to the driving member;

torque transfer means for releasibly connecting the driven member to the driving member in torque transmitting relation with each other when the driven member is in the engaged position;

biasing means for forcing the driven member into the disengaged position at a preselected biasing force;

clutch actuating means for forcing the driven member into the engaged position against the biasing force of the biasing means, the actuating means being automatically deactivated when rotation of the shaft stops or upon back-spin of the shaft and automatically activated only upon forward rotation of the shaft; and auxiliary coupling means for transmitting a selected amount of torque from the driving member to the driven member when the shaft is at standstill and the driven member is in the disengaged position, the selected torque being sufficient to initiate forward rotation of the shaft from standstill and activation of the clutch actuating means, but smaller than a torque required to build-up the elastic torsion in the shaft required to create a potentially hazardous back-spin of the shaft;

whereby the driven member is allowed to freely rotate relative to the driving member during back-spin of the shaft to prevent back-spin of the torque transmitting drive during operation of the safety coupling.

2. A safety coupling as defined in claim 1, wherein the clutch actuating means is hydraulically operated and includes a means for generating hydraulic operating pressure only when the shaft is rotated in the forward direction.

3. A safety coupling as defined in claim 2, wherein the means for generating hydraulic operating pressure is a uni-directional hydraulic pump.

4. A safety coupling as defined in claim 2, wherein the means for generating hydraulic operating pressure is a bi-directional hydraulic pump.

5. A safety coupling as defined in claim 2, wherein the selected torque is sufficient to rotate the shaft until sufficient hydraulic operating pressure for activation of the clutch actuation means is built up.

6. A safety coupling as defined in claim 2, wherein the driving and driven members are concentric sleeves and the clutch actuating means is a hydraulic actuating chamber positioned at an end of the driven member for applying the hydraulic operating pressure to the driven member and force the driven member to the engaged position.

7. A safety coupling as defined in claim 6, wherein the torque transfer means are a plurality of first and second, complementary locking teeth respectively positioned on the driving and driven member.

8. A safety arrangement for a drive string which stores reactive torque due to elastic torsion of the shaft, the drive string normally being rotated in a forward direction by the torque transmitting drive, and backspin of the drive string being caused by the release, upon interruption of power to the torque transmitting drive, of the reactive torque stored in the drive string, the arrangement comprising a safety coupling as defined in claim 2; and a brake disc for mounting on the shaft for rotation with the shaft;

a fluid actuated brake mechanism adapted to engage the brake disc and retard rotation of the brake disc and the shaft; and a hydraulic fluid control means for directing the fluid from the pump to the safety coupling when the shaft turns in the forward direction, and for directing the hydraulic fluid to the brake mechanism when the shaft stops turning in the forward direction and stored reactive torque is released from the shaft under tension resulting in back-spin of the shaft, whereby the stored torque is safely and controllably released.

9. A safety coupling as defined in claim 1, further comprising a shaft coupler for concentrically connecting the driven member with the shaft, the driven member being axially slidable on the shaft coupler and the shaft coupler and driven member including cooperating means for preventing rotation of the driven member relative to the shaft coupler while allowing sliding of the driven member therealong.

10. A safety arrangement for a drive string which stores reactive torque due to elastic torsion of the shaft, the drive string normally being rotated in a forward direction by the torque transmitting drive, and backspin of the drive string being caused by the release, upon interruption of power to the torque transmitting drive, of the reactive torque stored in the drive string, the arrangement comprising a safety coupling as defined in claim 1, the clutch actuating means being hydraulically operated, in combination with a safety brake arrangement including a hydraulically actuated brake mechanism to be mounted to the drive string, and a bi-directional hydraulic pump driven by a member associated with the drive string in both the engaged and disengaged positions of the safety coupling, and a hydraulic fluid control means for selectively supplying pressurized hydraulic fluid from the pump to the clutch actuating means during forward rotation of the shaft only and to the brake mechanism only during back-spin of the shaft, whereby upon the interruption of power to the shaft and the subsequent back-spin thereof, the safety coupling is disengaged and the back-spin of the shaft slowed down by the brake mechanism for safe and controlled release of the reactive torque stored in the shaft.

11. A safety coupling as defined in claim 1, wherein the biasing means is a helical disconnect spring forcing the driven member into the disengaged position in a direction parallel to a longitudinal axis of the driven member.

12. A safety coupling as defined in claim 1, wherein the auxiliary coupling means includes a ball held adjacent the driving member by a ball housing and a cooperating ball receiving opening and recess in the driving member and driven member respectively, and means for forcing the ball into the opening and recess to connect the driving and driven members for the transmission of the selected torque, the force of the means for forcing being selected such that the ball is forced out of the recess in the driven member upon generation of the torque which would be required for build-up of the elastic torsion of the shaft required to create a potentially hazardous back-spin in the shaft, the ball also being forced out of the recess when the driven member moves from the engaged to the disengaged position.

13. A safety coupling as defined in claim 12, wherein the opening is shaped and constructed such that the ball remains disengaged from the recess in the driven member upon the generation of the torque required for torsion build-up and during back-spin of the shaft.

14. A safety coupling as defined in claim 13, wherein the housing is axially slidable on the driving member between a starting position wherein the ball is engaged in the recess and a safety position wherein the ball is forced out of the recess and the driven member is in the disengaged position.

15. A safety coupling as defined in claim 14, wherein the opening is an elongated slot having a longitudinal axis oriented at an angle of about 45° to the longitudinal axis of the driven and driving members.

16. A safety coupling as defined in claim 12, wherein the auxiliary coupling means includes a plurality of balls and cooperating openings and recesses equidistantly positioned about an axis of rotation of the driven and driving members, and a common ball housing.

17. A safety coupling as defined in claim 12, wherein the means for forcing the ball into the recess is a spring-loaded ball washer.

\* \* \* \* \*

UNITED STATES PATENT AND TRADEMARK OFFICE
CERTIFICATE OF CORRECTION

PATENT NO. : 6,039,115
DATED : March 21, 2000
INVENTOR(S) : Robert A.R. Mills

It is certified that error appears in the above-indentified patent and that said Letters Patent is hereby corrected as shown below:

On the Title page item [73] Assignee: Kudu Industries, Inc.

Signed and Sealed this

Tenth Day of April, 2001

Attest:

NICHOLAS P. GODICI

Attesting Officer

Acting Director of the United States Patent and Trademark Office